US007203689B2

(12) United States Patent
Treil et al.

(10) Patent No.: US 7,203,689 B2
(45) Date of Patent: Apr. 10, 2007

(54) METHOD FOR PROCESSING STRUCTURED DATA USING AN OBJECT-ORIENTED COMPUTER LANGUAGE

(75) Inventors: Nicolas Herve Edouard Treil, Le Kremlin Bicetre (FR); Serge Jean Francois Gregor, Paris (FR); Vincent Philippe Leclerc, Paris (FR)

(73) Assignee: Cedara Software Corp., Mississauga (CA)

( * ) Notice: Subject to any disclaimer, the term of this patent is extended or adjusted under 35 U.S.C. 154(b) by 0 days.

(21) Appl. No.: 10/070,520

(22) PCT Filed: Jun. 28, 2001

(86) PCT No.: PCT/FR01/02073

§ 371 (c)(1),
(2), (4) Date: Jul. 16, 2002

(87) PCT Pub. No.: WO02/03246

PCT Pub. Date: Jan. 10, 2002

(65) Prior Publication Data

US 2002/0194152 A1    Dec. 19, 2002

(30) Foreign Application Priority Data

Jul. 2, 2000    (FR) .................................. 00 08631

(51) Int. Cl.
*G06F 17/00* (2006.01)
(52) U.S. Cl. .................. 707/101; 707/102; 707/103 R; 707/104.1
(58) Field of Classification Search ..................... 707/1, 707/100, 102, 104.1, 3, 10, 101, 103 R
See application file for complete search history.

(56) References Cited

U.S. PATENT DOCUMENTS 4,156,903 A    5/1979    Barton et al.
5,093,779 A    3/1992    Sakurai (Continued)

FOREIGN PATENT DOCUMENTS

EP    0 419 889 A2    4/1991

OTHER PUBLICATIONS

"Adobe Acrobat (TM) 4, Classroom in a Book," copyrighted Jan. 4, 2000, 2nd Edition, Excerpted from Lesson 10, 14 pages.*

*Primary Examiner*—Thuy N. Pardo
(74) *Attorney, Agent, or Firm*—Christie, Parker & Hale, LLP

(57) ABSTRACT

The invention concerns a data processing method comprising the following steps: a) receiving a set of structured and mutually linked data to be processed, of the value type with a name and/or container with a name and capable of containing at least a value having a name and/or another container having a name; b) defining a dictionary object adapted to store/find in a memory workspace a container or a value under/corresponding to a predetermined name; c) generating an empty instance of the dictionary object; d) verifying whether the structure of the data to be processed is of the value or container type; e) if the data is of the value type, storing/finding the value in the memory workspace under/corresponding to the name of the data to be processed, and returning to step d) until the last data to be processed of said set whereas if the data is of the container type, generating an empty dictionary sub-object as per step c), filling the dictionary subobject with the content of the data to be processed as per step c) to e), and returning to step d) until the last data of the set has been processed.

14 Claims, 3 Drawing Sheets

U.S. PATENT DOCUMENTS

Figure 1:
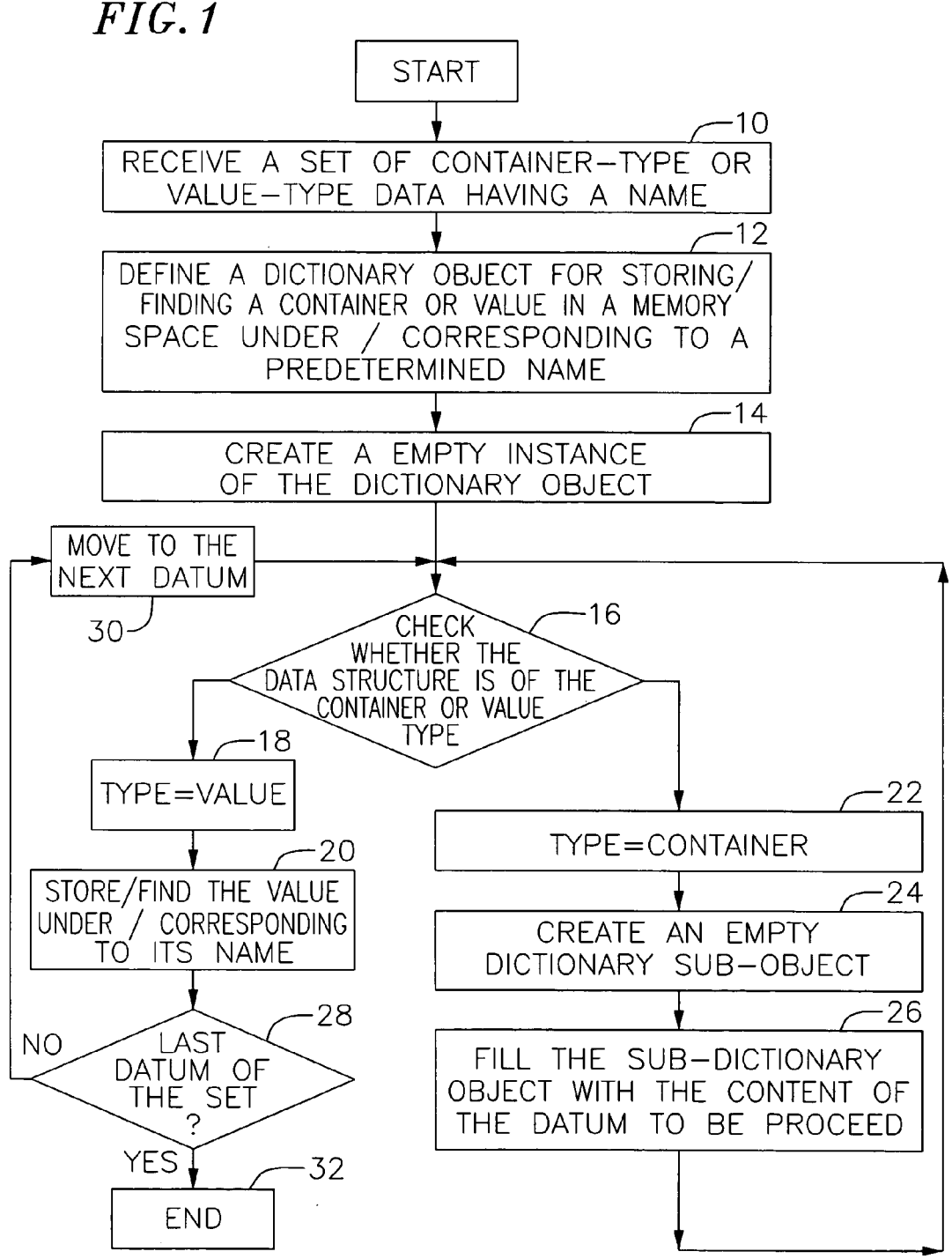

| | | | |
|---|---|---|---|
| 5,257,365 A | 10/1993 | Powers et al. | |
| 5,313,598 A | 5/1994 | Yamakawa | |
| 5,506,983 A * | 4/1996 | Atkinson et al. | 707/1 |
| 5,530,957 A | 6/1996 | Koenig | |
| 5,634,123 A * | 5/1997 | Bennion | 707/100 |
| 5,659,727 A * | 8/1997 | Velissaropoulos et al. | 707/2 |
| 5,687,365 A | 11/1997 | Velissaropoulos et al. | |
| 5,752,243 A | 5/1998 | Reiter et al. | |
| 5,778,389 A | 7/1998 | Pruett et al. | |
| 5,831,558 A | 11/1998 | Harvell | |
| 5,867,713 A * | 2/1999 | Shrader et al. | 717/176 |
| 5,956,728 A * | 9/1999 | Federighi et al. | 707/103 R |
| 5,970,494 A * | 10/1999 | Velissaropoulos et al. | 707/102 |
| 5,983,267 A * | 11/1999 | Shklar et al. | 709/217 |
| 5,995,975 A | 11/1999 | Malcolm | |
| 6,047,283 A | 4/2000 | Braun | |
| 6,226,649 B1 * | 5/2001 | Bodamer et al. | 707/104.1 |
| 6,230,157 B1 * | 5/2001 | Malcolm et al. | 707/100 |
| 6,253,239 B1 * | 6/2001 | Shklar et al. | 709/217 |
| 6,356,913 B1 * | 3/2002 | Chu et al. | 707/103 R |
| 6,486,897 B1 * | 11/2002 | Arrouye et al. | 715/853 |
| 6,490,719 B1 * | 12/2002 | Thomas | 717/107 |
| 6,499,036 B1 * | 12/2002 | Gurevich | 707/103 R |
| 6,539,396 B1 * | 3/2003 | Bowman-Amuah | 707/103 R |
| 6,628,305 B1 * | 9/2003 | Hong et al. | 715/734 |
| 6,651,072 B1 * | 11/2003 | Carino et al. | 707/104.1 |
| 2001/0056426 A1 * | 12/2001 | Obendorf | 707/100 |
| 2006/0020586 A1 * | 1/2006 | Prompt et al. | 707/3 |

* cited by examiner

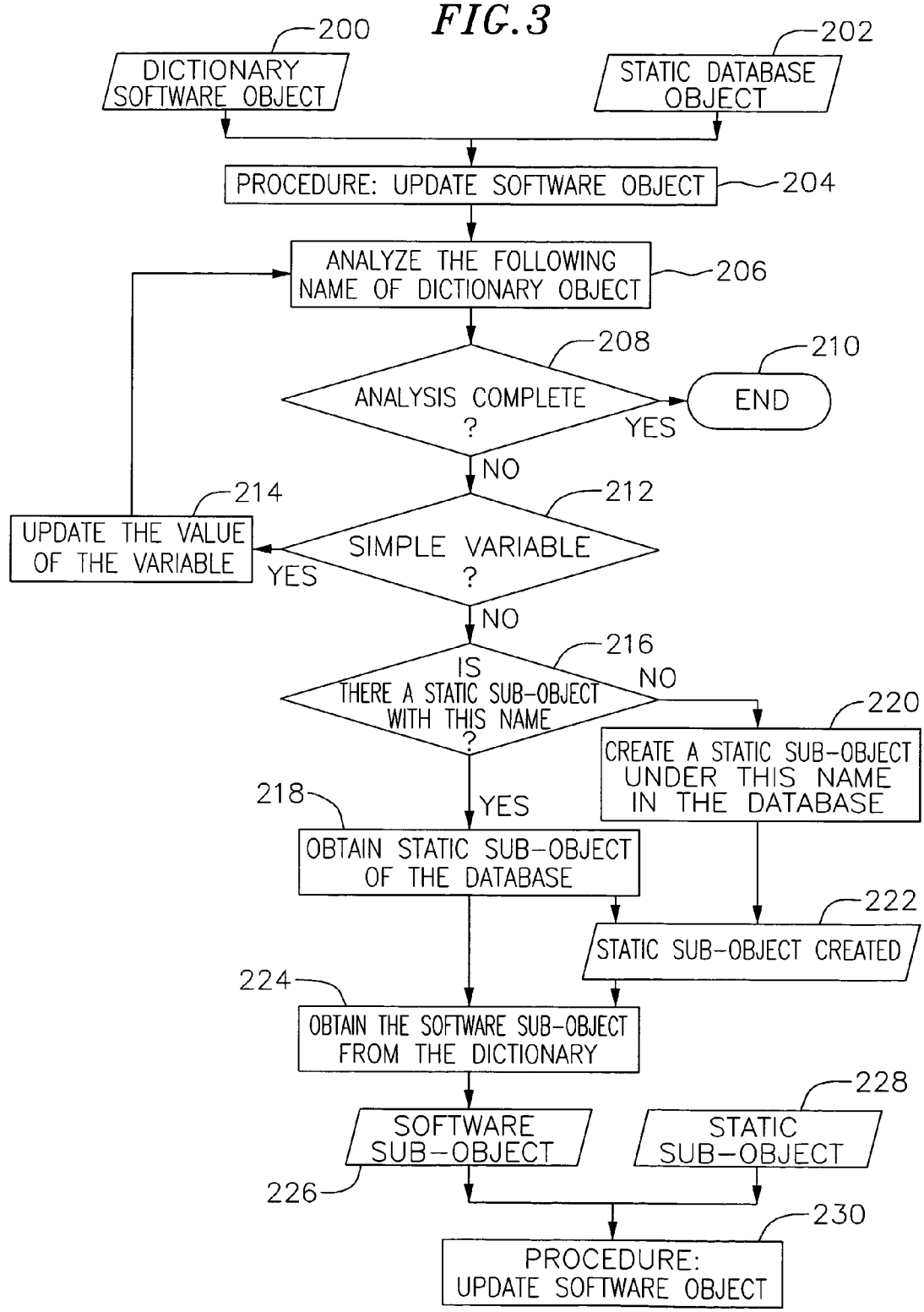

METHOD FOR PROCESSING STRUCTURED DATA USING AN OBJECT-ORIENTED COMPUTER LANGUAGE

CROSS-REFERENCE TO RELATED APPLICATION

This application claims priority of International patent application PCT/FR01/02073, filed Jun. 28, 2001, which in turn claims priority to French patent application number 00/08631, filed Jul. 3, 2000.

The present invention relates to a method of processing structured data using an object-based computer language.

It has a general application in the electronic modelling of data, the display of data, and the construction of client-server computer applications.

Methods of processing data are already known which permit the management of structured or hierarchical data, whose lowest level is for example a document (text, image, sound etc.)

For example, a method is known which permits a link, via an application server, between pages originating or passing through the Internet, still known as web pages, and a database. In this type of method, the usable fields or variables on the web pages must refer to fields described in the diagram of the database being used.

Such a method has the disadvantage of limiting the structuring of the data to a set predetermined diagram. Moreover, no apprenticeship capacity is possible with this method The result is that updating of the diagram of the data requires joint modification of the database and the page models, which encumbers, slows down and complicates updating.

A method is also known which uses an object-based language and permits the exchange of data between the web pages (or forms) and a database. In this type of method, the database is generally of the relational type, which excludes any possibility of apprenticeship. Moreover, the correspondence between the page data and the objects is made by using fields defined by the class of object. Thus, a datum which does not correspond to a field of the class of object cannot be managed in a page model.

The advantage of the method according to the invention is to permit the generation of extremely rapid applications and a totally flexible structure of object-based data.

For example, when the method according to the invention is applied to the storage of data in a database, the method according to the invention comprises the following stages:
1) providing a database;
2) receiving a set of data arranged according to a value-type hierarchical structure having a name and/or container having a name and capable of comprising at least one value and/or at least one other container having a name;
3) providing a database instance filled with a dictionary object;
4) in the case of a value-type datum, storing or replacing the value under its name in the dictionary object;
5) in the case of a container-type datum, verifying whether there is a dictionary object under the name of the datum to be processed;
6) if so, filling the dictionary object with the content of the datum and returning to stage 4) until the last datum of the set has been processed, but if not, creating an empty dictionary sub-object and filling the dictionary sub-object with the content of the datum to be processed and returning to stage 4) until the last datum of the set has been processed.

In practice, the data to be processed are received in the form of a dictionary object in order to be arranged in series consecutively in a selected storage space. In this case, the method according to the invention comprises the following stages:
I) receiving a dictionary object filled with at least one datum to be stored in a selected storage space;
II) for each name of a value and/or container stored in the dictionary object, analysing the structure of data contained in the dictionary object under that name;
III) in the case of a value-type datum, writing in the selected storage space the name of the value followed by a value marker and by the value itself, but in the case of a container-type datum, writing in the selected storage space a container marker, the name of the container, a value marker and the content of the datum to be processed, and an end-of-container marker.

According to another preferred realisation of the method according to the invention, the dictionary object is capable of storing in addition at least one calculating method under a predetermined name, and of finding as a value under this name the result of the associated calculating method.

For example, the data to be processed originate from a form or page in which the data are structured and linked to one another with value-type data having a name and/or container having a name and capable of containing a value or a container having a name.

Figure 2:
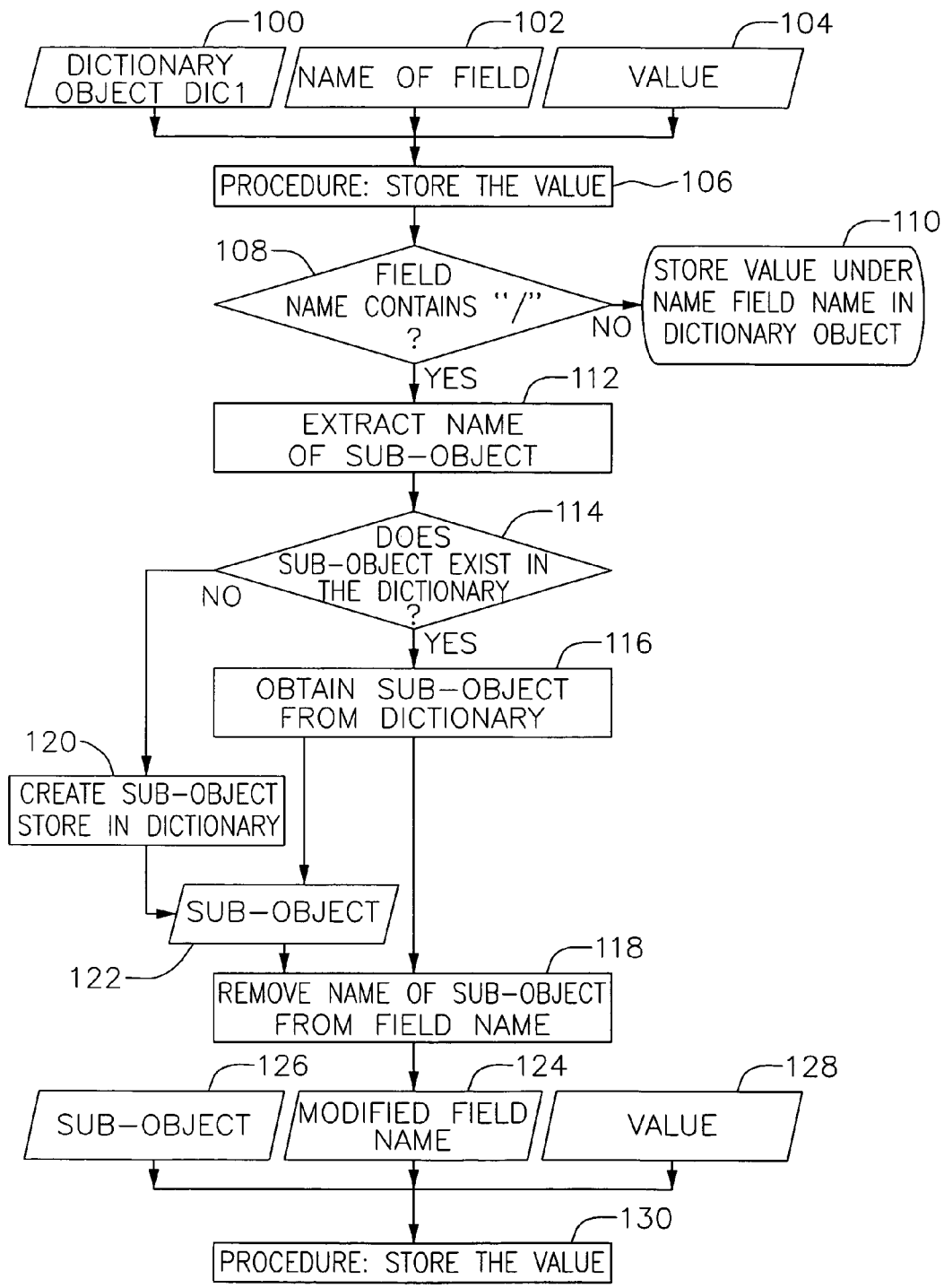

Further features and advantages of the invention will appear from the detailed description given below of the drawings, which show:

FIG. 1, a flow-chart illustrating the general stages of the method aci;

FIG. 2, a flow chart illustrating the method of the invention in the phase of storage of the data in a database; and FIG. 3, is a flow chart illustrating the method of updating a database according to the invention.

The present invention describes a generic mechanism of data encapsulation adapted to any data structure. The encapsulation mechanism according to the invention uses a base object referred to hereinafter as a dictionary object.

A dictionary object is understood here to mean an object which makes it possible to process (store and/or find) a value-type datum having a name or a container having a name, (the container being capable of itself containing at least one value having a name or at least one other container having a name).

The base function of a dictionary object is consequently to store in a memory space a container or a value under a predetermined name and also to find in a memory space the container or the corresponding value having a predetermined name.

The structure of a dictionary object is simple. The class of dictionary objects contains a table of names of the containers and values. The class of dictionary objects also comprises a table of containers and values which are labelled, i.e. arranged according to an index corresponding to that of the names of the containers or values.

For example, the techniques known as scrambling, such as those known as "hashtable" in JAVA language, or those described in the work "The art of computer programming", Vol 1–3 boxed set HBK, by Donald E Knuth, 1999, make it possible to realise dictionary objects.

In the prior art, most of the data encapsulation methods suppose that the objects have a predefined structure and that one has precise knowledge of the data structure. The encapsulation process is generally capable of processing data whose structure corresponds to that of the object. For example, a datum having a structure consisting of name, forename, and date of birth is conveniently processed if the object "person" has as variables name, forename and date of birth. On the other hand, the datum "address" is not processed if the structure of the object "person" does not understand this type of variable.

The method according to the invention makes it possible precisely to encapsulate data whose structure is not known a priori.

In the example mentioned above, the dictionary object DIC1 according to the invention stores the value "Dupont" in the variable having the name "name", the value "Paul" in the variable having the name "forename", and stores a dictionary object DIC2 under the name "address".

According to the invention, the dictionary object DIC2 is therefore capable of storing the value "3, allée des Violettes" in the variable having the name "street"; stores the value "Paris" under the name "town"; and stores the value "75012" under the name "postcode".

With reference to FIG. 1, the method of processing data according to the invention can be summarised under the following flow chart:

receive a set of data structured according to a hierarchy and linked together, the structure being of the value type having a name and/or container having a name and capable of containing a value and/or another container having a name (stage 10);

define a dictionary object capable of storing/finding a container or value in a memory space under/corresponding to a predetermined name (stage 12);

create an empty instance of the dictionary object (stage 14);

check whether the structure of the datum to be processed is of the container or value type (stage 16);

in the case of a value-type datum (stage 18), store/find the value under its name (stage 20), but in the case of a container-type datum (stage 22) create an empty dictionary sub-object (stage 24) according to stage 14, fill the dictionary sub-object with the content of the datum (stage 26) according to stages 16 to 32, and return to stage 16 until the last datum of the set has been processed (stages 28, 30 and 32).

Advantageously, the method according to the invention makes it possible furthermore to add to the data further variables whose values are not present in the objects or containers.

Thus in the above-mentioned example, the object or container "person" can store the value "date of birth" and be encapsulated in a container "person" which is capable of further displaying the age according to a suitable method of calculation.

Advantageously the invention makes it possible to process these variables whose values have been obtained by methods of calculation. These values are advantageously arranged according to the invention in the manner of a dictionary object whereby it is possible to associate the name of a value and the method of calculation used in order to supply the value.

More particularly, after the name of a value has been received, it is checked whether this value name is associated with a method of calculation in the dictionary object. If there is an associated method, it is arranged to calculate the value according to the associated method of calculation and thus to obtain a result. If there is no associated method, it is arranged to search in the dictionary object for data forming a result and to release the corresponding result.

The method according to the invention has various applications. One of these is to input into a database new data whose structure is not known a priori.

For example, the data are captured in user interface pages known as forms or capture pages.

The present invention proposes a formalism whereby it is possible to name each field or variable of the form so as to generate self-structured data which can be updated in a selected storage space (for example, database).

The formalism consists for example of naming each field of the form in the following manner name of object/ name of sub-object 1/ . . . / name of sub-object n/ name of value The objects and sub-objects are here containers having a name.

It should be noted that the oblique / is an arbitrary separator which may be replaced by any other arbitrary character.

Container end and/or value end markers may also be provided.

Certain variables (container and/or value) may be empty.

By means of this formalism, when the data and field names are sent to an application server, it is possible to generate objects (containers) corresponding to the desired data structure.

For example, a form comprising the following fields and values:

| | |
|---|---|
| PERSON/NAME | DUPONT |
| PERSON/FORENAME | Jean |
| PERSON/CAR/MAKE | Ford |
| PERSON/CAR/MODEL | Escort |

With such a form it is possible to generate the following object:

Dictionary-type dictionary object Dic 1 stores the value "Dupont" under the field name "name", the value "Jean" under the field name "forename", and a dictionary-type dictionary object, Dic 2 under the field name "car".

The dictionary-type dictionary object DIC2 therefore stores the value "Ford" under the field name "make" and also the value "Escort" under the field name "model."

FIG. 2 shows a flow chart which illustrates the storage procedure of a value according to the invention.

According to stage 100, a dictionary object DIC1, a field name (stage 102) and the corresponding attributed value (stage 104) are provided or received.

At the end of stages 100, 102 and 104, one can move on to storing the value (stage 106).

For each field name, the structure of the data contained in the said field under this name are analysed (stage 108). In practice, it is checked whether the field name contains the oblique "/".

If the field name does not contain the arbitrary separating character (here an oblique), the value is stored under the name "field name" in the dictionary object (stage 110). Indeed, at this stage, the datum is of the simple variable type, i.e. the type of datum containing only a value under a name.

On the other hand, if the field name contains the arbitrary separator, this means that the datum is of the "container" type, capable of containing another object or sub-object. Then the name of this field is extracted (stage 112) and it is checked whether a sub-object exists in the dictionary object under this name (stage 114).

If so, the sub-object of the dictionary is obtained (stage 116) and the field name is modified (stage 124) by removing the part preceding the separator "/", as well as the separator itself (stage 118).

On the other hand, if there is no sub-object in the dictionary object, it is arranged to create a sub-object (stage 120) and this is stored in the dictionary object.

When the sub-object is thus created (stage 122), it is arranged to modify the field name (stage 124) by) by removing the part preceding the separator "/", as well as the separator itself (according to the above-mentioned stage 118).

After the process has been carried out, one has a sub-object (stage 126), a modified field name (stage 124) and a corresponding value (stage 128), so that it is possible to store the value (stage 130) by reiteration of the process according to stages 108 to 130.

If the above-mentioned example is used according to the flow chart of FIG. 2, one has a dictionary object corresponding to the description of a person with field names "NAME", "FORENAME", and the values "DUPONT" and "JEAN".

This dictionary object also comprises a container "CAR" storing the value "FORD" under the field name "MAKE".

According to stages 108 to 110, the value "JEAN" is stored in the field name "FORENAME".

According to stages 108, 112, 114, 116, 118, 124, 126, 128, 130 and then 108 to 110, the value "ESCORT" is stored in the field name "CAR/MODEL".

Finally, according to stages 108, 112, 114, 120, 122, 118, 124, 126, 128, 130 and then 108 to 110, the value "PARIS" is stored in the field name "ADDRESS/TOWN".

With reference to FIG. 3, the present invention also has the object of a method of updating the data of a dictionary object encapsulated as described above.

Starting from what is known as a "software" dictionary object, i.e. one resulting from an encapsulation such as described above (stage 200), and from a database object, known as "static", i.e. non-encapsulated (stage 202), the procedure "update software object" is ready to start (stage 204).

The method is contrived to analyse the content (here every name) of the dictionary object to be processed (stages 206 and 208).

If there is a name, one moves on to the following processing stage (stage 212), if not one ends the process (stage 210).

If the name corresponds to a simple variable, the value of the variable is updated in the database (stage 214), according to storage methods which are not the subject of the present invention.

On the other hand, if the data is of the "container" type, it is checked whether there is a static sub-object in the database having this name (stage 216).

If so, a static sub-object corresponding to this name is searched in the database (stage 218), but in the absence of a static sub-object in the database under this name, it is arranged to create a static sub-object with this name in the database (stage 220).

At the end of stages 218 or 220, one has a static sub-object, and one obtains the software sub-object of the corresponding dictionary object (stage 224), the sub-object being encapsulated according to the encapsulating process according to the invention.

At the end of stage 224, one thus has a software sub-object (stage 226) which is homologous with the software object defined at stage 200, and a static sub-object (stage 228), originating from the database, which is homologous with the static object defined at stage 202.

With these static and software objects, it is possible to update the software (here dictionary) object data (stage 230) in the static object (here the database).

The present invention is a method of generating an application capable of being implanted by using a formalism of hierarchical data representation and using an object-based computer language of the Java or C++ type or the like.

The main advantage of the present invention is the capacity to modify dynamically the description diagram of the data, in particular to manage easily new types of objects or new values.

Moreover, in the case of a client-server application, in which the clients interact with the data (creation, modification, deletion), it is possible with the invention to reference objects of the database in pages on the web forming the user interface. It is thus possible to reference values or containers of values which do not exist in capture forms. Once these formulae have been sent to the application server according to the invention, these new containers and values are created in the database.

An advantageous, but non-limiting application of the present invention is in the medical field, in particular in the setting up of a healthcare network for managing patient clinical records.

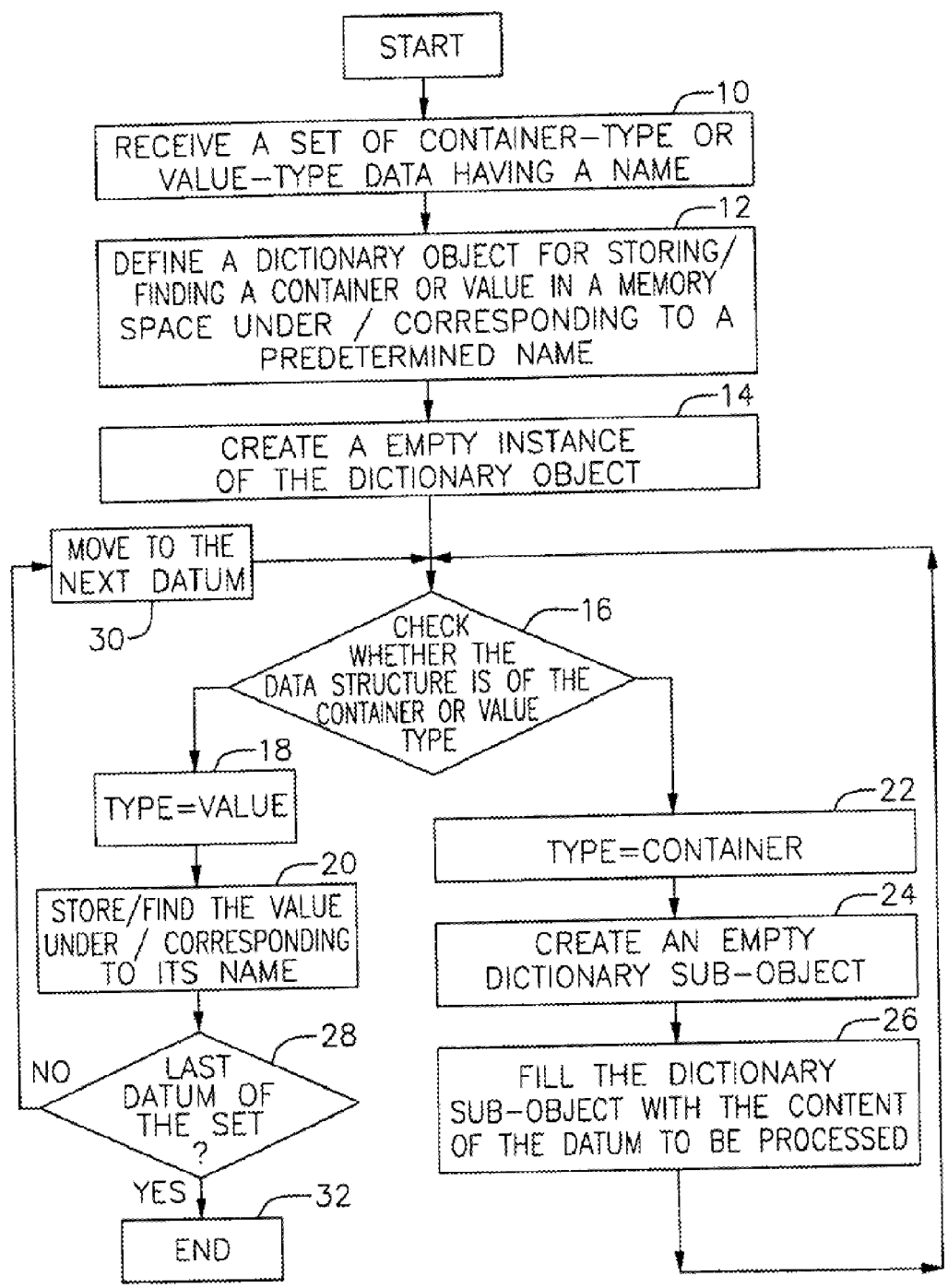

The invention claimed is:

1. A memory accessible to an application program being executed on a data processing system, comprising:

an object-oriented data structure stored in said memory, the data structure for encapsulating data used by the application program and including a base dictionary object implemented as a hashtable and being capable of storing value type data and container type data, said container type data being capable of storing said value type data and said container type data, said base dictionary object containing at least one datum of either said value type data or said container type data and having a name arranged in a table, said base dictionary object being chosen from a class of dictionary objects, said data being encapsulated by adding said at least one datum to an empty instance of said base dictionary object and, if said datum is of said value type data, storing said datum under a particular name in said base dictionary object and, if said datum is of said container type data, creating a new dictionary sub-object stored in, and accessible from, said base dictionary object under the particular name, said sub-object being capable of storing said value type data and said container type data; wherein additional data is configured to be dynamically added to said base dictionary object, said sub-object or an additional sub-object according to the type of data.

2. The memory according to claim 1 wherein the data structure further comprises at least one marker for separating corresponding ones of either said container type datum or said value type datum.

3. The memory according to claim 2 wherein said marker comprises a character included with said particular name corresponding to said datum.

4. The memory according to claim 1 further comprising a database for storing said data.

5. The memory according to claim 1 wherein said data originates from a web page.

6. A method for encapsulating data for storage thereof, each datum being one of value type data and container type data, wherein said container type data is capable of storing said value type data and said container type data, said method comprising:

choosing a base dictionary object from a class of dictionary objects, said dictionary object capable of storing said value type data and said container type data;

creating an empty instance of said base dictionary object and implementing a hashtable in said base dictionary object for storing said datum; and adding a datum to said base dictionary object, said datum having a name arranged in a table, wherein if said datum is of said value type data, storing said datum under a particular name in said base dictionary object and, if said datum is of said container type data, creating a new dictionary sub-object stored in, and accessible from, said base dictionary object under the particular name, said sub-object being capable of storing said value type data and said container type date.

7. A method according to claim 6 further comprising:

obtaining an additional datum;

adding said additional datum to said base dictionary object under a second particular name if said additional datum is of said value type data;

adding said additional datum to said sub-object under the second particular name if said additional datum is of said value type data and a member of said sub-object; and creating an additional dictionary sub-object stored in and accessible from said base dictionary object under the second particular name if said additional datum is of said container type data.

8. A method according to claim 7 further comprising repeating the adding and creating for at least one further datum included in a set of said data.

9. A method according to claim 6 further comprising storing said datum in a database.

10. A method according to claim 6 further comprising including a marker with said particular name corresponding to said datum for separating said datum from others of said data.

11. A method according to claim 6 wherein said data originates from a web page.

12. A method according to claim 6 wherein the determination that said datum is of said container type data is made based on the determination that said particular name corresponding to said datum includes a container indicia.

13. A method for updating a set of data encapsulated in a base dictionary object implemented as a hashtable to include a new datum, each datum in said set of data being one of a value type data and a container type data and having a name arranged in a table, said value type data capable of being stored in said container type data said method comprising:

determining a name and type of said new datum;

if said type of said new datum is said value type, searching said table to determine if said name of said new datum is included in said table, if said name of said new datum is included, updating said base dictionary object with said new datum, if said name of said new datum is not included, adding said new datum to said base dictionary object and adding the name to said table; and if said name of said new datum is said container type, searching said table to determine if a sub-object exists having said name of said new datum, if said sub-object exists, updating said sub-object to include said new datum, if said sub-object does not exist, creating a new sub-object including said new datum and storing said new sub-object in said base dictionary object.

14. A method according to claim 13 wherein said new datum originates from a web page.

* * * * *

UNITED STATES PATENT AND TRADEMARK OFFICE
CERTIFICATE OF CORRECTION

PATENT NO. : 7,203,689 B2
APPLICATION NO. : 10/070520
DATED : April 10, 2007
INVENTOR(S) : Nicolas Herve Edouard Treil et al.

It is certified that error appears in the above-identified patent and that said Letters Patent is hereby corrected as shown below:

On the Title Page

(57) Abstract, line 15      After "said set",
Insert --has been processed--

(30) Foreign Application Priority Data      Delete "Jul. 2, 2000",
Insert --Jul. 3, 2000--

In the Drawings

FIG. 1, Ref. No. 26      Delete Drawing Sheet 1 and substitute therefore the Drawing Sheet, consisting of Fig. 1, as shown on the attached page

In the Claims

Column 7, line 18, Claim 6      Delete "date",
Insert --data--

Column 7, line 19, Claim 7      Delete "A",
Insert --The--

Column 7, line 32, Claim 8      Delete "A",
Insert --The--

Column 7, line 35, Claim 9      Delete "A",
Insert --The--

Column 8, line 1, Claim 10      Delete "A",
Insert --The--

UNITED STATES PATENT AND TRADEMARK OFFICE
CERTIFICATE OF CORRECTION

PATENT NO. : 7,203,689 B2
APPLICATION NO. : 10/070520
DATED : April 10, 2007
INVENTOR(S) : Nicolas Herve Edouard Treil et al.

It is certified that error appears in the above-identified patent and that said Letters Patent is hereby corrected as shown below:

| | |
|---|---|
| Column 8, line 5, Claim 11 | Delete "A", Insert --The-- |
| Column 8, line 7, Claim 12 | Delete "A", Insert --The-- |
| Column 8, line 16, Claim 13 | After "data", Insert --,-- |
| Column 8, line 25, Claim 13 | Delete "name", Insert --type-- |
| Column 8, line 32, Claim 14 | Delete "A", Insert --The-- |

Signed and Sealed this

Twenty-sixth Day of August, 2008

JON W. DUDAS
*Director of the United States Patent and Trademark Office*